United States Patent
Tai et al.

(10) Patent No.: US 7,508,463 B2
(45) Date of Patent: Mar. 24, 2009

(54) PIXEL STRUCTURE

(75) Inventors: Meng-Chieh Tai, Yilan County (TW); Chih-Chung Liu, Changhua County (TW); Yueh-Ping Chang, Kaohsiung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 297 days.

(21) Appl. No.: 11/609,334

(22) Filed: Dec. 12, 2006

(65) Prior Publication Data

US 2008/0088783 A1 Apr. 17, 2008

(30) Foreign Application Priority Data

Oct. 12, 2006 (TW) .............. 95137514 A

(51) Int. Cl.
*G02F 1/136* (2006.01)
*G02F 1/1337* (2006.01)
*G02F 1/1343* (2006.01)

(52) U.S. Cl. .......... 349/48; 349/129; 349/130; 349/144

(58) Field of Classification Search .......... 349/48, 349/144

See application file for complete search history.

(56) References Cited

U.S. PATENT DOCUMENTS 5,777,700 A * 7/1998 Kaneko et al. .......... 349/39
7,206,048 B2 * 4/2007 Song .......... 349/129
2004/0001167 A1 1/2004 Takeuchi et al.
2005/0030439 A1 2/2005 Lyu
2005/0286003 A1 12/2005 Lee et al.

FOREIGN PATENT DOCUMENTS

CN 1469175 1/2004
CN 1687836 10/2005

* cited by examiner

*Primary Examiner*—Michael H Caley
(74) *Attorney, Agent, or Firm*—Jianq Chyun IP Office

(57) ABSTRACT

A pixel structure suitable for being controlled by a scan line and a data line disposed on a thin film transistor (TFT) array substrate of a multi-domain vertical alignment (MVA) liquid crystal display is disclosed. The pixel structure includes a first TFT, a second TFT, a first pixel electrode, a second pixel electrode and a plurality of alignment members, wherein the first TFT and the second TFT are both electrically connected to the scan line and the data line. The first TFT has a first drain and the first pixel electrode is electrically connected to the first drain. The second TFT has a second drain and the second pixel electrode is floated over the second drain to form a coupling capacitor, while a voltage difference is established between the second pixel electrode and the first pixel electrode. The alignment members are disposed on the first and the second pixel electrode.

7 Claims, 3 Drawing Sheets

PIXEL STRUCTURE

CROSS-REFERENCE TO RELATED APPLICATION

This application claims the priority benefit of Taiwan application serial no. 95137514, filed Oct. 12, 2006. All disclosure of the Taiwan application is incorporated herein by reference.

BACKGROUND OF THE INVENTION

1. Field of the Invention

The present invention generally relates to a pixel structure of a liquid crystal display (LCD) panel, and more particular, to a pixel structure of a multi-domain vertical alignment (MVA) LCD panel.

2. Description of Related Art

The LCDs are being developed toward of high brightness, high contrast, mega screen and wide angle of view techniques, wherein several wide angle of view technologies have been provided to improve the angle of view of an LCD, for example, an MVA LCD, an in-plane switching (IPS) LCD and a fringe field switching (FFS) LCD, etc.

FIG. 1 is a schematic top view of a conventional pixel structure applied in a MVA LCD. Referring to FIG. 1, a pixel structure 100 is disposed on a thin film transistor (TFT) array substrate. The pixel structure 100 includes a scan line 110, a data line 120, a TFT 130, a pixel electrode 140 and a protrusion 150, wherein the TFT 130 includes a gate 132, a semiconductor layer 134, a source 136a, a drain 136b and a contact hole 138. The gate 132 is electrically connected to the scan line 110 and the semiconductor layer 134 is disposed over the gate 132. The source 136a and the drain 136b are disposed on the semiconductor layer 134, wherein the source 136a is electrically connected to the data line 120.

The pixel electrode 140 is electrically connected to the drain 136b through the contact hole 138. Besides, in order to make liquid crystal molecules take a multi-domain vertical alignment, a protrusion 150 is disposed on the pixel electrode 140, while a plurality of protrusions (not shown) are disposed on a color filter substrate facing the pixel electrode 140. In this way, by mutually corresponding the protrusion 150 and the protrusions of the color filter substrate, the liquid crystal molecules between the TFT array substrate and the color filter substrate are able to tilt in various directions, which further achieve a wide angle of view display effect.

Although the above-mentioned MVA LCD has an increasing angle of view range, but the MVA LCD gamma curve of the light transmittance related to the gray level are different as the angle of view changing from 0° to 90°. In short, the distortion of hue and luminance distribution of a image provided by the MVA LCD would be more noticeable with the angle of view change.

SUMMARY OF THE INVENTION

The present invention is to provide a pixel structure to reduce the sensitivity of the display quality to the change of angle of view.

The present invention provides a pixel structure suitable for being controlled by a scan line and a data line of a TFT array substrate of an MVA LCD panel. The pixel structure includes a first TFT, a second TFT, a first pixel electrode, a second pixel electrode and a plurality of alignment members, wherein the first TFT and the second TFT are electrically connected to both the scan line and the data line. The first TFT has a first drain and the first pixel electrode is electrically connected to the first drain. The second TFT has a second drain and the second pixel electrode is floated over the second drain, so as to form a coupling capacitor and to create a voltage difference between the second pixel electrode and the first pixel electrode. The alignment members are disposed on the first pixel electrode and the second pixel electrode.

In an embodiment of the present invention, the ratio of the first pixel electrode area over the second pixel electrode area can be 1:1.

In an embodiment of the present invention, the ratio of the first pixel electrode area over the second pixel electrode area can be 1:2.

In an embodiment of the present invention, the first TFT and the second TFT can share a common source.

In an embodiment of the present invention, the first pixel electrode and the second pixel electrode can be respectively located at both sides of the scan line.

In an embodiment of the present invention, the pixel structure further includes a common line disposed under the first pixel electrode and the second pixel electrode.

In an embodiment of the present invention, the alignment member can be protrusions or silts.

Based on the above description, since the pixel structure of the present invention utilizes two pixel electrodes and one of the pixel electrodes is floated over the drain of one of the two TFTs to form a coupling capacitor, thus, a voltage difference between the two pixel electrodes is created, which enables the liquid crystal molecules over the two pixel electrodes to tilt in different angles and reduces the variation of the MVA LCD gamma curve of the light transmittance related to the gray level as the change of angle of view.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
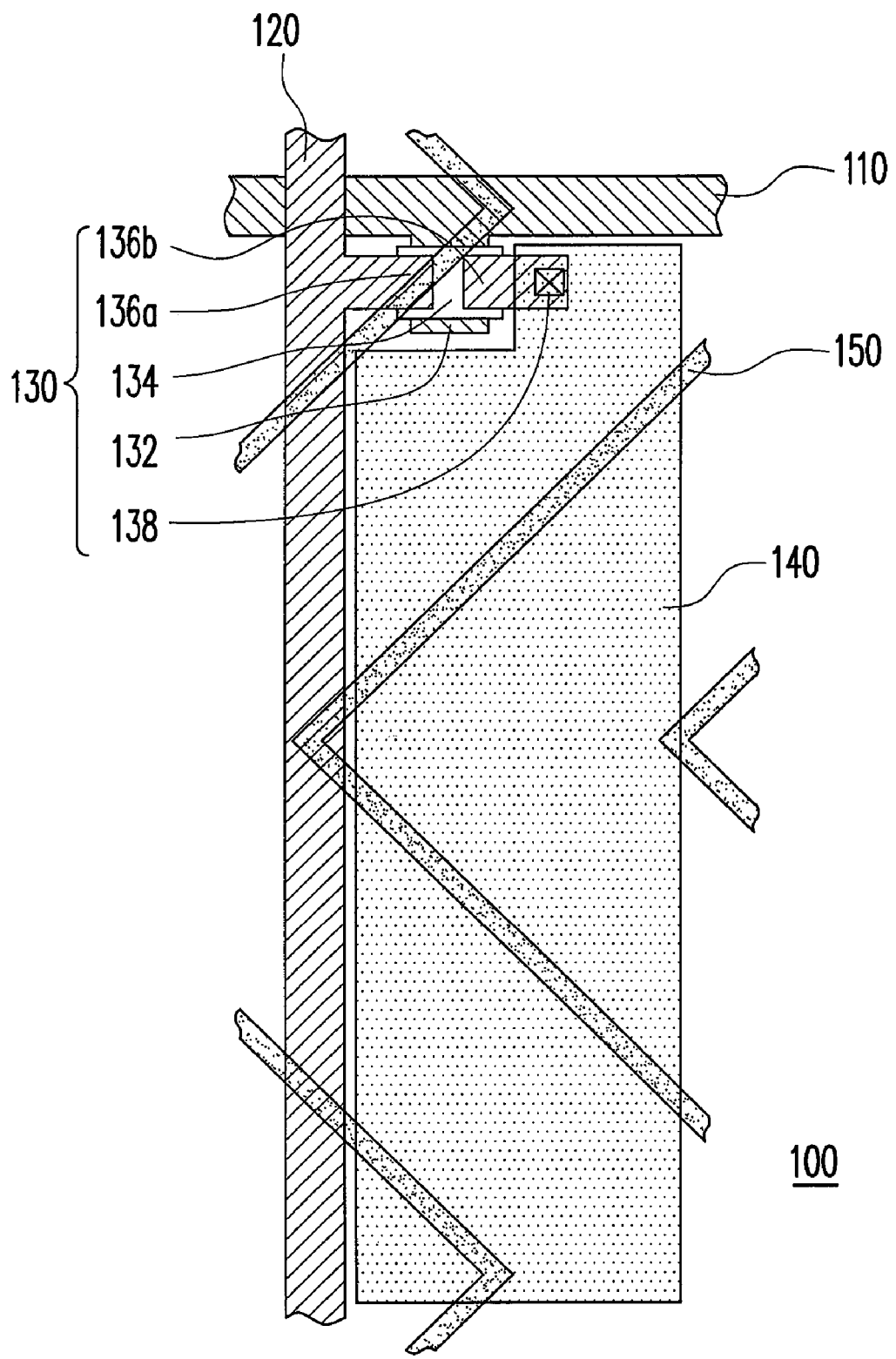
FIG. 1 is a schematic top view of a conventional pixel structure applied in a MVA LCD.
Figure 2:
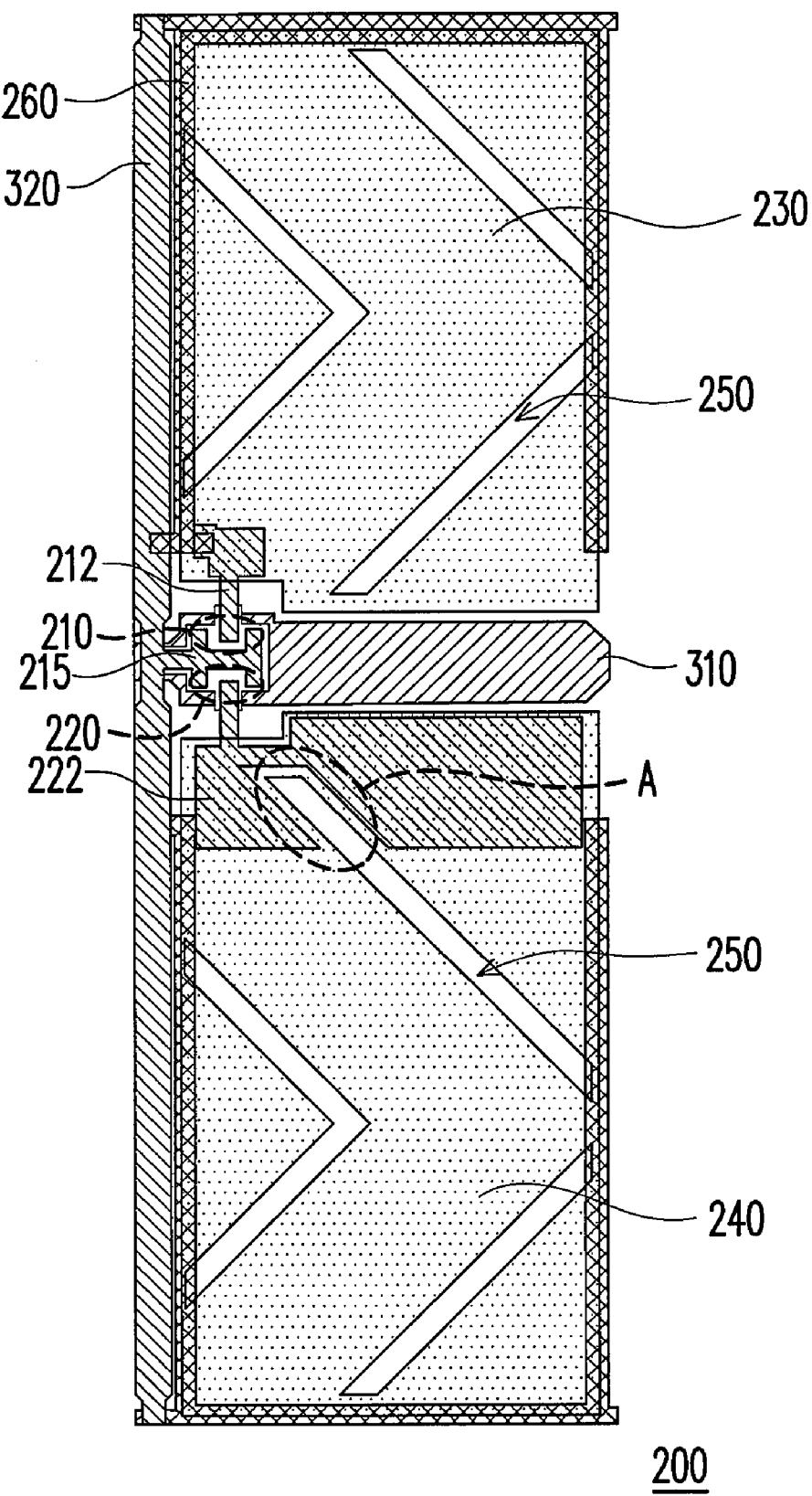
FIG. 2 is a schematic top view of a pixel structure according to an embodiment of the present invention.

FIG. 2 is a schematic top view of a pixel structure according to an embodiment of the present invention. Referring to FIG. 2, the pixel structure 200 of the embodiment is suitable for being controlled by a scan line 310 and a data line 320 disposed on a TFT array substrate of an MVA LCD panel. The pixel structure 200 includes a first TFT 210, a second TFT 220, a first pixel electrode 230, a second pixel electrode 240 and a plurality of alignment members 250, wherein the first TFT 210 is electrically connected to the scan line 310 and the data line 320, while the second TFT 220 is also electrically connected to the scan line 310 and the data line 320. Besides, the first TFT 210 has a first drain 212 and the first pixel electrode 230 is electrically connected to the first drain 212. The second TFT 220 has a second drain 222 and the second pixel electrode 240 is floated over the second drain 222 to form a coupling capacitor Ccp, therefore a voltage difference is created between the second pixel electrode 240 and the first pixel electrode 230. The alignment members 250 are disposed on the first pixel electrode 230 and the second pixel electrode 240.

In more detail, since the second pixel electrode 240 is floated over the second drain 222, a voltage difference between the second pixel electrode 240 and the first pixel electrode 230 is created, which enables the liquid crystal molecules over the first pixel electrode 230 and the second pixel electrode 240 to tilt in different angles so as to reduce the variation of the gamma curve of the light transmittance related to the gray level as the change of angle of view. Therefore, the MVA LCD employing the pixel structure 200 of the present embodiment is capable of providing better display quality.

In the embodiment, the first pixel electrode 230 and the second pixel electrode 240 are respectively located at both sides of the scan line 310. However, both of the first pixel electrode 230 and the second pixel electrode 240 can be alternatively located at a same side of the scan line 310. In addition, in the present embodiment, the ratio of the area of the first pixel electrode 230 over the area of the second pixel electrode 240 may be 1:1. In another embodiment, the ratio of the area of the first pixel electrode 230 over the area of the second pixel electrode 240 may be 1:2 or any other ratio.

In the present embodiment, the first TFT 210 and the second TFT 220 share a common source 215. In another embodiment, the first TFT 210 and the second TFT 220 can respectively have an independent source. In the embodiment, the first TFT 210 and the second TFT 220 respectively use a part of the scan line 310 as the gate thereof. In another embodiment, the first TFT 210 and the second TFT 220 can respectively have an independent gate. In the embodiment, the alignment members 250 are silts. In another embodiment, the alignment members 250 can be protrusions. Besides, to avoid the liquid crystal molecules from being interfered by the electric field of the second drain 222, a slit A is formed in the second drain 222 and the region of the slit A is corresponding to the alignment members 250.

In the embodiment, the pixel structure 200 further includes a common line 260 disposed under the first pixel electrode 230 and the second pixel electrode 240 to form a storage capacitor. In other words, the storage capacitor of the embodiment is created on the common line (Cst on common). However, the present invention does not limit the architecture of the storage capacitor to be Cst on common. In other embodiments, the storage capacitance can be created on the scan line (Cst on gate), for example, the storage capacitor can be created by partially overlapping the first pixel electrode 230 with the scan line 310 and partially overlapping the second pixel electrode 240 and the scan line 310. The equivalent circuit of the present embodiment is explained in the following.

Figure 3:
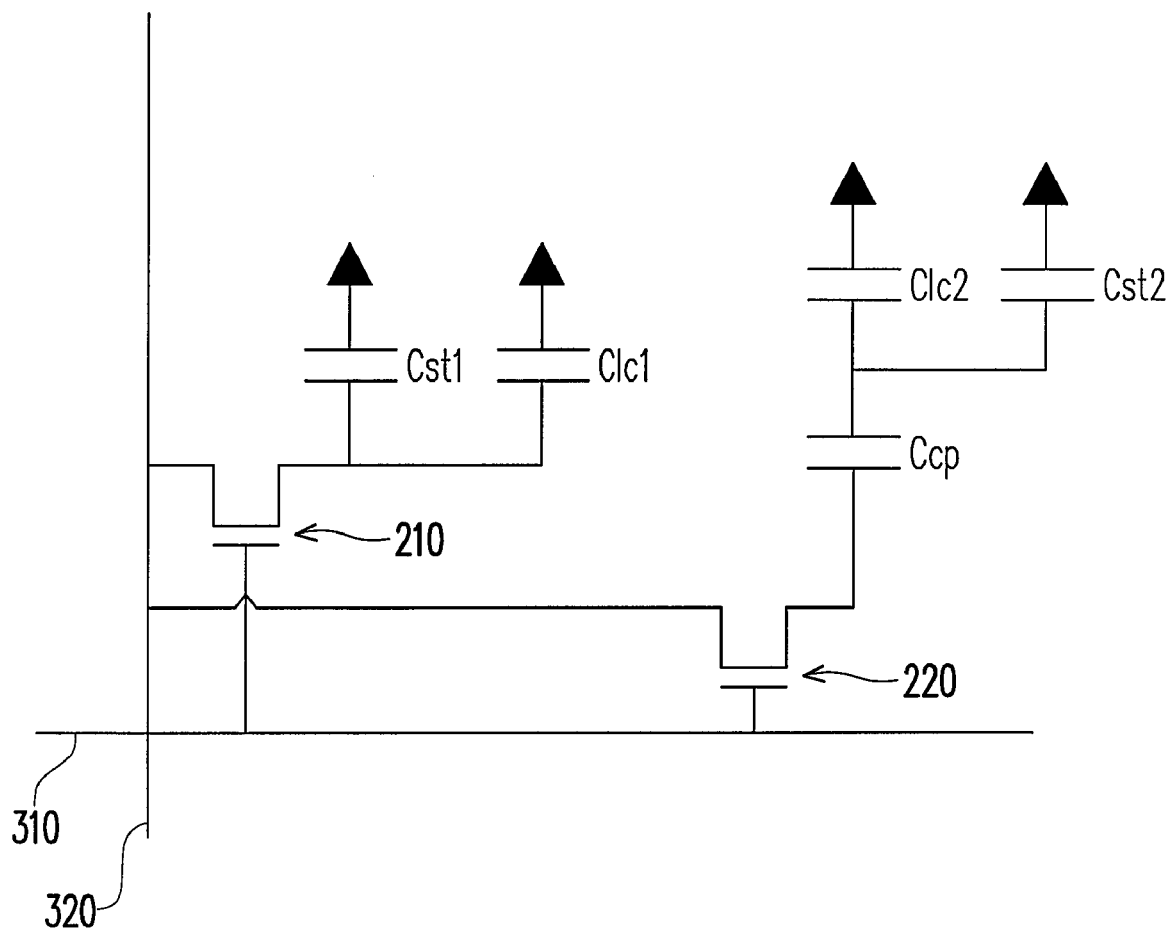
FIG. 3 is the equivalent circuit drawing of the pixel structure shown by FIG. 2.

FIG. 3 is the equivalent circuit drawing of the pixel structure shown by FIG. 2. Referring to FIG. 3, $C_{lc1}$ represents the first liquid crystal capacitor (first LC capacitor) formed by the first pixel electrode 230 and a common electrode (not shown) disposed on the substrate facing the first pixel electrode 230, $C_{st1}$ represents the first storage capacitor formed by the first pixel electrode 230 and the common line 260, $C_{cp}$ represents the coupling capacitor formed by the second pixel electrode 240 and the second drain 222, $C_{lc2}$ represents the second liquid crystal capacitor (second LC capacitor) formed by the second pixel electrode 240 and the common electrode and $C_{st2}$ represents the second storage capacitor formed by the second pixel electrode 240 and the common line 260.

Referring to FIGS. 2 and 3, when a high-level signal is input to the scan line 310, the first TFT 210 and the second TFT 220 are turned on, while the data voltage would be input to the first pixel electrode 230 through the first drain 212. In addition, the data voltage is also input to the second drain 222. However, since the second pixel electrode 240 is floated over the second drain 222, the voltage inducted by the second pixel electrode 240 is less than the voltage of the first pixel electrode 230. That is to say, the tilt angles of the liquid crystal molecules over the first pixel electrode 230 and the second pixel electrode 240 are different from each other, which can reduce the color shift phenomena during changing the angle of view. Therefore, the MVA LCD adopting the pixel structure 200 of the present embodiment is able to provide better display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, suitable for being controlled by a scan line and a data line disposed on a thin film transistor array substrate of a multi-domain vertical alignment (MVA) liquid crystal display (LCD) panel, comprising:
    a first thin film transistor, electrically connected to the scan line and the data line, and having a first drain;
    a second thin film transistor, electrically connected to the scan line and the data line, and having a second drain;
    a first pixel electrode, electrically connected to the first drain;
    a second pixel electrode, floated over the second drain to form a coupling capacitor, wherein a voltage difference is established between the second pixel electrode and the first pixel electrode; and
    a plurality of alignment members, disposed on the first pixel electrode and the second pixel electrode.

2. The pixel structure according to claim 1, wherein a ratio of the first pixel electrode area over the second pixel electrode area is 1:1.

3. The pixel structure according to claim 1, wherein a ratio of the first pixel electrode area over the second pixel electrode area is 1:2.

4. The pixel structure according to claim 1, wherein the first thin film transistor and the second thin film transistor share a common source.

5. The pixel structure according to claim 1, wherein the first thin film transistor and the second thin film transistor are respectively located at both sides of the scan line.

6. The pixel structure according to claim 1, further comprising a common line disposed under the first pixel electrode and the second pixel electrode.

7. The pixel structure according to claim 1, wherein the alignment members comprise protrusion members or silts.

* * * * *